US010785819B2

(12) United States Patent
Cariou et al.

(10) Patent No.: US 10,785,819 B2
(45) Date of Patent: Sep. 22, 2020

(54) MAXIMUM IDLE PERIOD FOR MULTI-BAND DUAL CONNECTIVITY

(71) Applicant: Intel IP Corporation, Santa Clara, CA (US)

(72) Inventors: Laurent Cariou, Portland, OR (US); Po-Kai Huang, San Jose, CA (US); Robert Stacey, Portland, OR (US)

(73) Assignee: Intel IP Corporation, Santa Clara, CA (US)

(*) Notice: Subject to any disclaimer, the term of this patent is extended or adjusted under 35 U.S.C. 154(b) by 11 days.

(21) Appl. No.: 16/163,472

(22) Filed: Oct. 17, 2018

(65) Prior Publication Data

US 2019/0053311 A1  Feb. 14, 2019

Related U.S. Application Data

(60) Provisional application No. 62/724,524, filed on Aug. 29, 2018, provisional application No. 62/608,441, filed on Dec. 20, 2017, provisional application No. 62/574,048, filed on Oct. 18, 2017.

(51) Int. Cl.
| | |
|---|---|
| *H04W 72/08* | (2009.01) |
| *H04W 76/15* | (2018.01) |
| *H04W 74/00* | (2009.01) |
| H04W 88/08 | (2009.01) |
| H04W 88/06 | (2009.01) |

(52) U.S. Cl.
CPC .......... *H04W 76/15* (2018.02); *H04W 72/08* (2013.01); *H04W 74/00* (2013.01); H04W 88/06 (2013.01); H04W 88/08 (2013.01)

(58) Field of Classification Search
None
See application file for complete search history.

(56) References Cited

U.S. PATENT DOCUMENTS

| | | | |
|---|---|---|---|
| 2008/0123577 A1* | 5/2008 | Jaakkola | H04W 52/287 370/311 |
| 2014/0169338 A1* | 6/2014 | Bajko | H04W 72/042 370/336 |
| 2014/0247711 A1* | 9/2014 | Gantman | H04W 48/20 370/221 |
| 2015/0043409 A1* | 2/2015 | Choi | H04W 52/0229 370/311 |
| 2016/0044711 A1* | 2/2016 | Lou | H04B 7/0695 370/338 |
| 2016/0242182 A1* | 8/2016 | Chen | H04B 7/04 |
| 2017/0019865 A1* | 1/2017 | Wang | H04W 48/08 |
| 2017/0064727 A1* | 3/2017 | Chrisikos | G01S 19/42 |

* cited by examiner

*Primary Examiner* — Fahmida S Chowdhury
(74) *Attorney, Agent, or Firm* — Eversheds Sutherland (US) LLP

(57) ABSTRACT

This disclosure describes systems, methods, and devices related to multi-band dual connectivity. A device may establish a first connection with a first access point on a first band. The device may establish a second connection with a second access point on a second band. The device may determine a multi-band maximum idle period. The device may cause to send a presence indication to at least one of the first access point or the second access point within the multi-band maximum idle period.

18 Claims, 7 Drawing Sheets

MAXIMUM IDLE PERIOD FOR MULTI-BAND DUAL CONNECTIVITY

CROSS-REFERENCE

This application claims the benefit of U.S. Provisional Application No. 62/574,048, filed Oct. 18, 2017, U.S. Provisional Application No. 62/608,441, filed Dec. 20, 2017, and U.S. Provisional Application No. 62/724,524, filed Aug. 29, 2018, the disclosures of which are incorporated herein by reference as if set forth in full.

TECHNICAL FIELD

This disclosure generally relates to systems and methods for wireless communications and, more particularly, to maximum idle period for multi-band dual connectivity.

BACKGROUND

Wireless devices are becoming widely prevalent and are increasingly requesting access to wireless channels. One or more institute of electrical and electronics engineers (IEEE) standards utilize Orthogonal Frequency-Division Multiple Access (OFDMA) in channel allocation.

DETAILED DESCRIPTION

Figure 1:
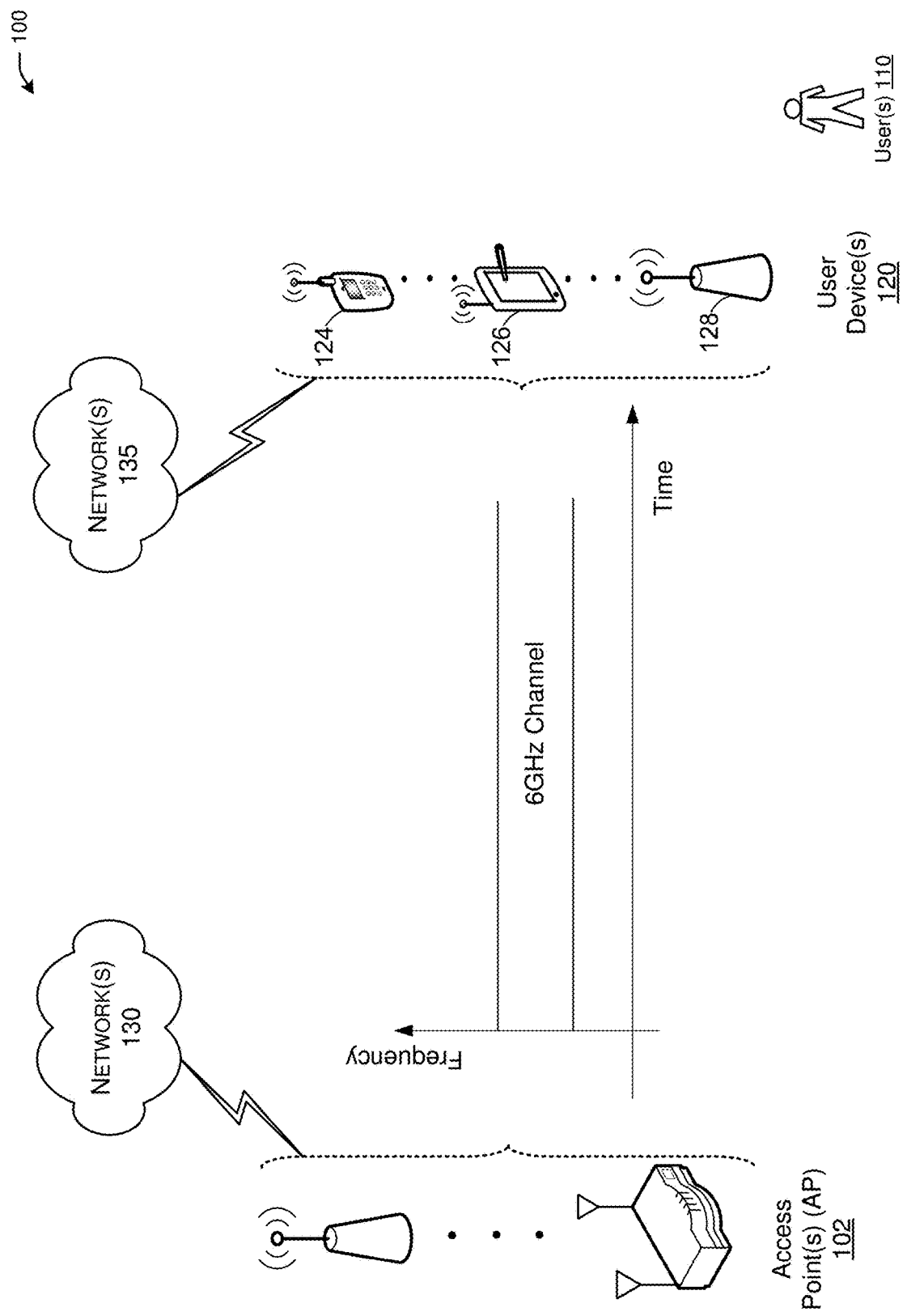
FIG. 1 is a network diagram illustrating an example network environment for multi-band dual connectivity, in accordance with one or more example embodiments of the present disclosure.

Example embodiments described herein provide certain systems, methods, and devices for multi-band dual connectivity.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

The main features for next generation of 802.11 standard (also referred to as next best thing (NBT), a Next Generation Wi-Fi, or extremely high throughput (EHT)) are currently multiband operation and 6 GHz greenfield physical layer (PHY) design.

First, to enable significant throughput and capacity increase over 802.11ax, a main focus for NBT is to expand operations on more operating bands. Operation on the 6 GHz band seems to be a compelling candidate for this expanded operation. In other words, operation in the 6 GHz band is a promising option as an addition to existing 2.4 GHz and 5 GHz 802.11ax deployments, and not only as a stand-alone operation on the 6 GHz band.

Devices that operate in the 6 GHz band (e.g., stations (STAs) and access points (APs)) may be dual-band (e.g., a dual-band device operates in two bands, such as any two of 2.4 GHz, 5 GHz, or 6 GHz) or tri-band (e.g., a tri-band device operates in three bands, such as 2.4 GHz, 5 GHz, and 6 GHz). Devices that are dual-band or tri-band are collectively referred to as multi-band devices. Multi-band devices may be concurrent or non-concurrent. Concurrent devices are devices that operate in more than one band contemporaneously. Non-concurrent devices are devices that operate in a one band at a time. Multi-band APs may tend to be mostly concurrent and multi-band STAs may tend to be mostly non-concurrent. However, the present disclosure applies to multi-band devices (e.g., both APs and STAs) that are concurrent and to multi-band devices (e.g., both APs and STAs) that are non-concurrent.

Because operation on the 6 GHz band will not be usable by legacy devices, deployment on the 6 GHz band will have to be designed as an overlay over the existing 2.4 GHz and 5 GHz deployment. Because of this overlay, multi-band APs will operate at 2.4 GHz, 5 GHz, and 6 GHz, and a STA that is within range of such a multi-band AP will see the AP is available for communication at the 2.4 GHz, 5 GHz, and 6 GHz bands. The STA may determine a similar received signal strength indicator (RSSI) for each of the 2.4 GHz, 5 GHz, and 6 GHz bands of the multi-band AP.

One of the main solutions to exploit such multi-band deployment is to allow STAs to be connected simultaneously to the APs in each band. The STA may then switch from an AP on one band to an AP on another band (e.g., in a non-concurrent scenario) and/or the STA may transmit and/or receive data on different bands contemporaneously (e.g., in a concurrent scenario). Multi-band deployment may be accomplished with fast session transfer (FST) (or with any other dual connectivity mechanisms).

Some STAs may only be non-concurrent multi-band (e.g., some STAs may operate in only one band at a time). If a multi-band non-concurrent STA is connected with multiple APs (e.g., with a first AP on a first band, such as a 5 GHz band, and with a second AP on a second band, such as a 6 GHz band), the multi-band STA will be operating at one instant in time with only one AP (e.g., with only the first AP on the first band or with only the second AP on the second band). However, it may be advantageous to keep the connection with the two APs, even though the STA operates on one band at a time. For example, it may be advantageous for a STA to keep the connection with the two APs because re-establishing a connection with an AP may consume valuable energy and bandwidth resources.

Currently, for each AP, there is a Basic Service Set (BSS) Max Idle period, which defines the maximum amount of time during which the STA can refrain from transmitting a frame to its serving AP without being disassociated from the serving AP. Currently, in a dual connectivity context, a STA would need to ensure that it transmits a frame on each of the bands (e.g., to a first AP on a first band and to a second AP on a second band) within each BSS Max Idle period in order to avoid being disassociated from each AP.

In the case of dual connectivity, for example in cases of collocated APs where APs are located within a same device, it would be logical that the transmission of a frame by a STA in one of the bands would act as an indication of a presence of the STA for all the bands and not just for the band on which the frame has been transmitted. In other words, it would be desirable to allow a multi-band STA to avoid being disassociated from both a first AP on a first band and a second AP on a second band by transmitting a frame either to the first AP on the first band or to the second AP on the second band.

Example embodiments of the present disclosure relate to systems, methods, and devices for multi-band dual connectivity.

In some embodiments, a multi-band dual connectivity system may facilitate modifications to a BSS Max Idle period.

In some embodiments, a multi-band dual connectivity system may support a multi-band maximum idle period. If a multi-band STA is dual connected to two or more multi-band APs (e.g., to a first AP on a first band, such as a 2.4 GHz band, to a second AP on a second band, such as a 5 GHz band, and/or to a third AP on a third band, such as a 6 GHz band) that support a multi-band maximum idle period, one or more of the two or more multi-band APs may signal the multi-band maximum idle period to the multi-band STA. A STA is considered connected to an AP when it is, for example, associated with the AP. The two or more multi-band APs may be collocated or may be spatially separated. In other words, the present disclosure contemplates that the two or more multi-band APs may be collocated (e.g., housed within a single unit) or may be separate devices.

In some embodiments, a multi-band dual connectivity system (e.g., a multi-band STA in communication with one or more multi-band APs) may determine a multi-band maximum idle period based on an existing BSS Max Idle period. One multi-band AP or multiple multi-band APs may signal the multi-band maximum idle period to the multi-band STA.

In some embodiments, the multi-band maximum idle period may be an existing BSS Max Idle period. For example, if the BSS Max Idle period(s) advertised by the multiple APs in the different bands are different (e.g., a first BSS Max Idle period of a first AP that communicates with a STA on first band has a first value, a second BSS Max Idle period of a second AP that communicates with the STA on a second band has a second value that is different from the first value, and/or a third BSS Max Idle period of a third AP that communicates with the STA on a third band has a third value that is different from the first value), the multi-band maximum idle period may be equal to the lowest BSS Max Idle period across the multiple APs (e.g., across the first AP, the second AP, and the third AP).

In some embodiments, a multi-band dual connectivity system (e.g., a multi-band STA in communication with one or more multi-band APs) may manage multi-band dual connectivity with a fast session transfer (FST) protocol. However, managing multi-band dual connectivity with the existing FST protocol may require a modification to the FST protocol. For example, a first device that is multi-band may be capable of operating as a non-AP STA in each of the supported bands of a second multi-band device operating as an AP STA in each of the supported bands. If the first multi-band device has established an FST session on each of the supported bands with the second multi-band device (e.g., so that the non-AP STAs from the first device are associated with the AP STAs from the second device on multiple bands), then the FST BSS Max Idle period may be the minimum between the BSS Max Idle period advertised by the AP STAs in different bands.

In some embodiments, the FST protocol may be further modified such that a non-AP STA of the first multi-band device that is included in the FST session may be considered inactive if none of the APs from the second device that is included in the FST session has received a frame within a certain time period. For example, the frame may be one of a Data frame, PS-Poll frame, or Management frame (protected or unprotected) of a frame exchange sequence initiated by the STA, and the time period may be a time period greater than or equal to the time specified by the FST Max Idle Period field.

In some embodiments, a multi-band dual connectivity system may define a bit in a BSS Max Idle period element that indicates that the provided BSS Max Idle period is valid for all of the bands on which the AP operates (e.g., on one or more of a 2.4 GHz band, a 5 GHz band, and/or a 6 GHz band) or is valid for only the current band. If a provided BSS Max Idle period is indicated as being valid for all of the bands on which the AP operates, then a STA may indicate its presence on all of the bands (and avoid being disassociated from any of the bands) by sending a frame in any of the bands. If a provided BSS Max Idle period is indicated as being valid for only the current band, a STA may have to indicate its presence on each of the bands.

In some embodiments, a multi-band dual connectivity system may allow a STA to indicate its presence by sending a frame at least once every multi-band maximum idle period in at least one of the bands to one of the APs. A STA may avoid being disassociated from an AP by indicating its presence in the at least one of the bands of one of the APs. This presence indication in one of the bands by the STA may act as a presence indication transmitted in all the bands with all the APs that are part of the dual connectivity. As a consequence, a STA cannot be disassociated from a first AP in a first band if the STA sent a frame to the second AP in the second band if the STA is dual connected with the first AP and with the second AP.

In some embodiments, a STA may determine a multi-band maximum idle period. The maximum idle period may be based on one or more of information advertised by two or more APs during a FST session and/or on a BSS Max Idle period element identified from one or more APs. The STA may cause to send a frame to the one or more APs based at least in part on the multi-band maximum idle period. In some embodiments, the frame may be one or more of a Data frame, PS-Poll frame, or Management frame (protected or unprotected) of a frame exchange sequence initiated by the STA. The STA may be associated with at least two of a first AP on a first band (e.g., on a 2.4 GHz band), a second AP on a second band that is different from the first band (e.g., on a 5 GHz band), and a third AP on a third band that is different from the first band and from the second band (e.g., on a 6 GHz band). The STA may cause to send the frame to at one of the first AP on the first band, the second AP on the second band, and the third AP on the third band. Each of the APs may determine, based at least in part on the frame, not to disassociate the STA from that AP, regardless of the band on which the frame was sent.

In some embodiments, a multi-band dual connectivity system may allow a STA to stay dual connected and/or associated with multiple APs even if the STA stays in power save for a long period of time and only signals the STA's presence in one of the two or more bands. The use of a multi-band maximum idle period may save energy and overhead.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an example network environment of multi-band dual connectivity, according to some example embodiments of the present disclosure. Wireless network 100 may include one or more user devices 120 and one or more access points(s) (AP) 102, which may communicate in accordance with Institute of Electrical and Electronics Engineers (IEEE) 802.11 communication standards. The user device(s) 120 may be mobile devices that are non-stationary (e.g., not having fixed locations) or may be stationary devices.

Figure 6:
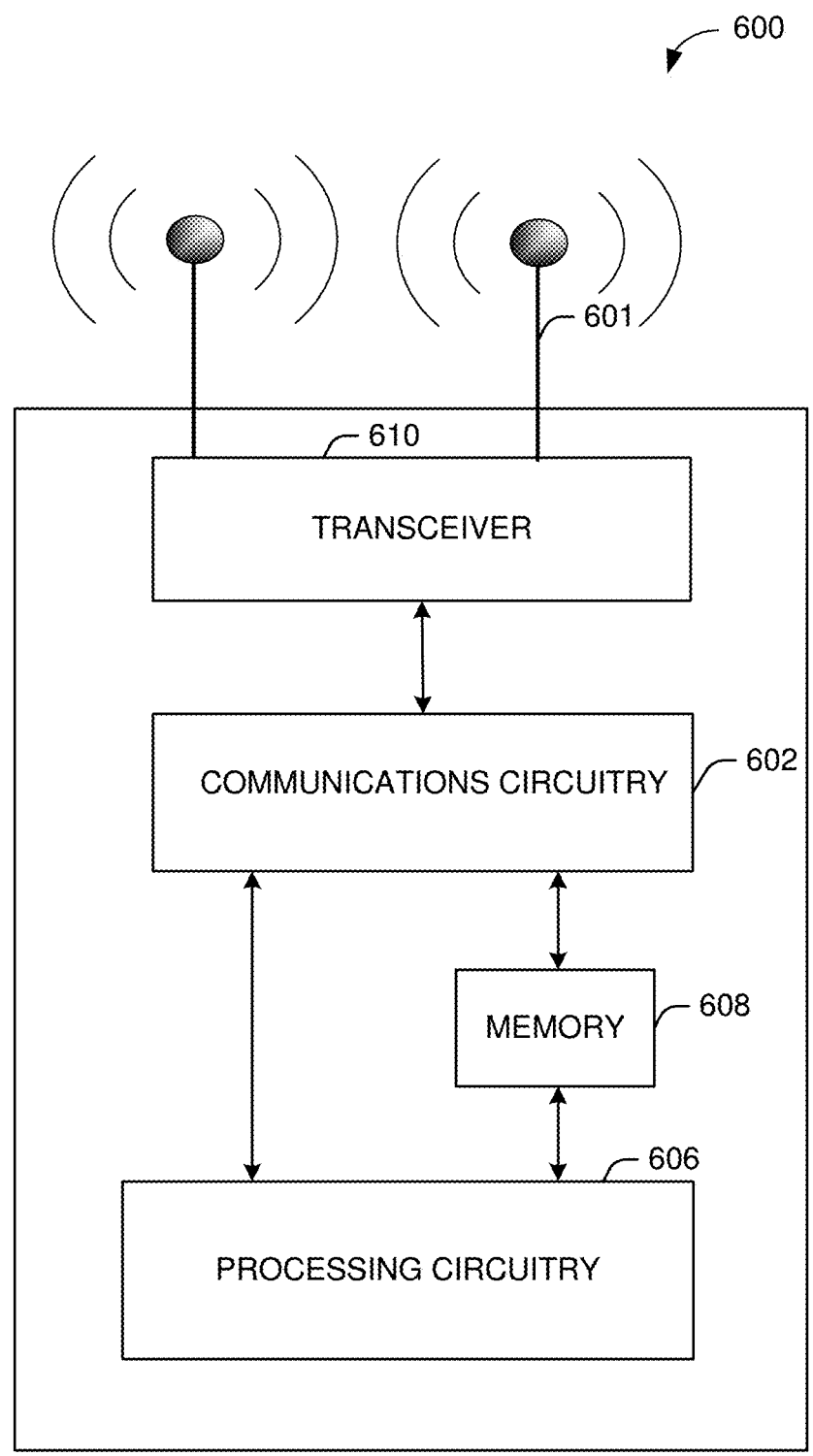
FIG. 6 illustrates a functional diagram of an exemplary communication station that may be suitable for use as a user device, in accordance with one or more example embodiments of the present disclosure.
Figure 7:
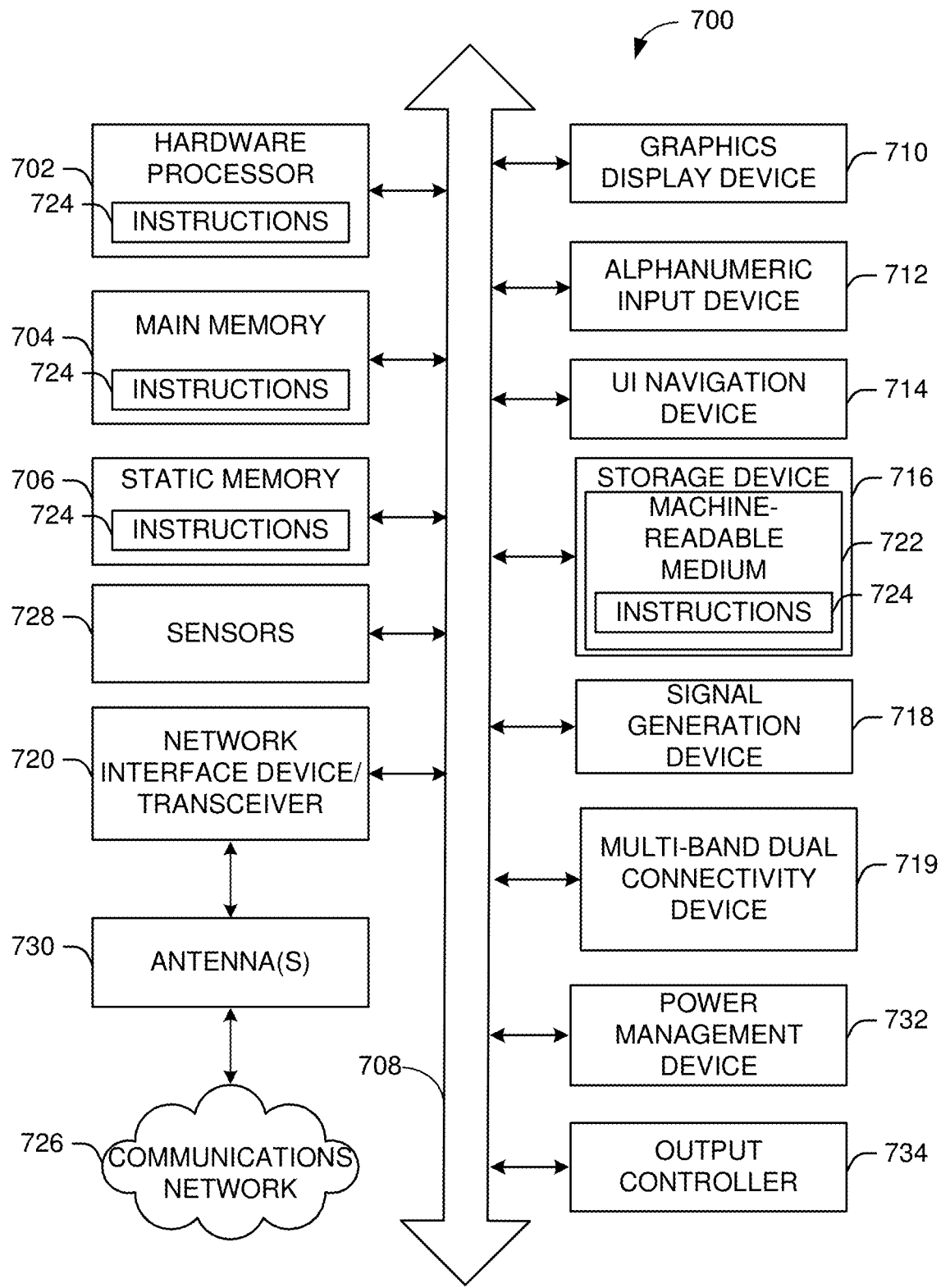
FIG. 7 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 6 and/or the example machine/system of FIG. 7.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static, device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, IEEE 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128) and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the IEEE 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHz channels (e.g. 802.11ad, 802.11ay). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, AP 102 may communicate with one or more user devices 120 using OFDMA. For example, the AP 102 and the one or more user devices 120 may communicate using a 6 GHz channel in time and frequency domain.

A multi-band dual connectivity system (e.g., devices that operate within wireless network 100 of FIG. 1) may manage multi-band dual connectivity with FST protocol. The FST protocol may indicate that if dot11BssMaxIdlePeriod is a nonzero (e.g., if the BSS Max Idle period is a value other than zero), the STA shall include the BSS Max Idle Period element in the Association Response frame or the Reassociation Response frame. Otherwise, the STA shall not include the BSS Max Idle Period element in the Association Response frame or the Reassociation Response frame. A STA may send protected or unprotected keepalive frames, as indicated in the Idle Options field. The Max Idle Period field of the BSS Max Idle Period element may indicate the time period during which a STA can refrain from transmitting frames to its associated AP without being disassociated. A non-AP STA may be considered inactive if the AP has not received a Data frame, PS-Poll frame, or Management frame (protected or unprotected) of a frame exchange sequence initiated by the STA for a time period greater than or equal to the time specified by the Max Idle Period field. If the Idle Options field requires protected keepalive frames, then the AP may disassociate the STA if no protected frames are received from the STA for a period indicated by the Max Idle Period field of the BSS Max Idle Period element. If the Idle Options field allows unprotected or protected keepalive frames, then the AP may disassociate the STA if no protected or unprotected frames are received from the STA for a duration indicated by the Max Idle Period field of the BSS Max Idle Period element. It should be noted that the AP can disassociate or deauthenticate the STA at any time for other reasons even if the STA satisfies the keep-alive frame transmission requirements.

An existing FST protocol may be modified. For example, a first device that is multi-band (e.g., the user device(s) 120 of FIG. 1) may be capable is operating as a non-AP STA in each of the supported bands of a second multi-band device operating as an AP STA in each of the supported bands (e.g., the AP 102 of FIG. 1). If the first multi-band device has established an FST session on each of the supported bands with the second multi-band device (e.g., so that the non-AP STAs from the first device are associated with the AP STAs from the second device on multiple bands), then the FST BSS Max Idle period may be the minimum between the BSS Max Idle period advertised by the AP STAs in different bands.

In some embodiments, the FST protocol may be further modified such that a non-AP STA of the first multi-band device that is included in the FST session is considered inactive if none of the APs from the second device that is included in the FST session has received a Data frame, PS-Poll frame, or Management frame (protected or unprotected) of a frame exchange sequence initiated by the STA for a time period greater than or equal to the time specified by the FST Max Idle Period field.

It is understood that the above descriptions are for purposes of illustration and are not meant to be limiting.

Figure 2A:
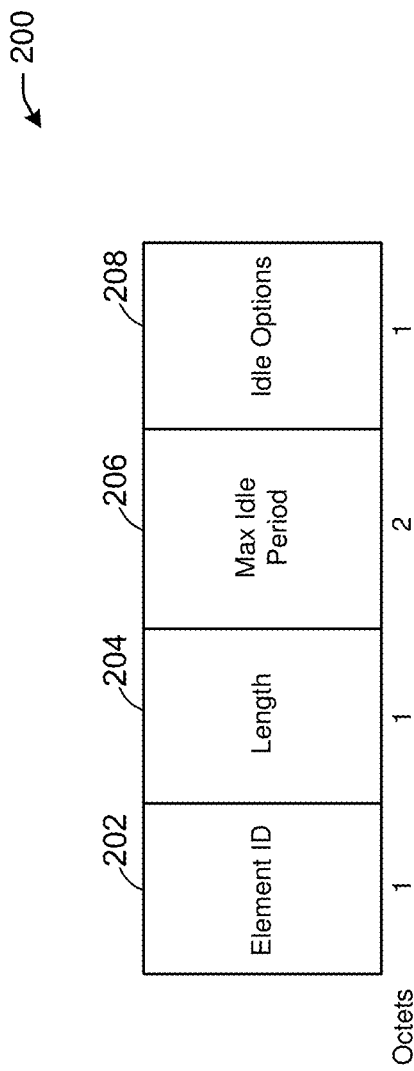
FIGS. 2A-2B depict illustrative schematic diagrams for multi-band dual connectivity, in accordance with one or more example embodiments of the present disclosure.
Figure 2B:
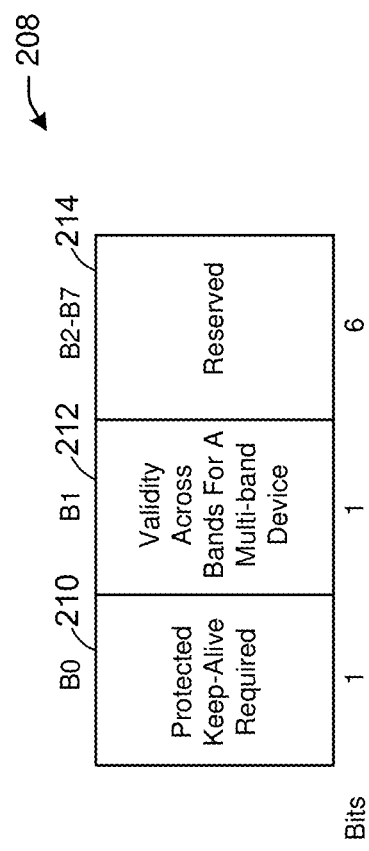

FIGS. 2A-2B depict illustrative schematic diagrams for a BSS Max Idle Period element 200, in accordance with one or more example embodiments of the present disclosure.

In some embodiments, a multi-band dual connectivity system (e.g., devices that operate within wireless network 100 of FIG. 1) may manage multi-band dual connectivity with a new bit in a BSS Max Idle Period element 200.

FIG. 2A depicts a BSS Max Idle Period element format, in accordance with one or more example embodiments of the present disclosure. The BSS Max Idle Period element 200 may be part of a transmission sent by an AP to a STA during association (e.g., the BSS Max Idle Period element 200 may be included in Association Request and Response frames).

The BSS Max Idle Period element 200 may contain the time period a non-AP STA can refrain from transmitting frames to the AP before the AP disassociates the STA due to inactivity. The format of the BSS Max Idle Period element 200 is shown in BSS Max Idle Period element format depicted in FIG. 2A. The BSS Max Idle Period element 200 may include an Element ID field 202, a Length field 204, a Max Idle Period field 206, and an Idle Options field 208.

The BSS Max Idle Period element 200 may have a common general format comprising a 1 octet Element ID field 202, a 1 octet Length field 204, a 2 octet Max Idle Period field 204, and a 1 octet Idle Options field 208. The BSS Max Idle Period element 200 may be identified by the contents of the Element ID field 202 (and, when present, an Element ID Extension field(s), as defined in the IEEE 802.11 standard). The Length field 204 may specify the number of octets following the Length field 204.

The Max Idle Period field 206 may indicate the maximum idle timeout limit. For example, the time period may be specified in units of 1000 TUs. The value of 0 may be reserved. In a non-sub-1 GHz (S1G) STA, the Max Idle Period field 206 may be an unsigned integer that contains the value of the parameter BSSMaxIdlePeriod. In an S1G STA, the two most significant bits (MSBs) of the Max Idle Period field 206 may contain the Unified Scaling Factor subfield and the remaining 14 bits may contain the Unscaled Interval subfield. In an S1G STA, the value of the BSSMaxIdlePeriod parameter used by the MLME primitives may be in units of 1000 TUs and may be equal to the value of the Unscaled Interval subfield, multiplied by the scaling factor that corresponds to the value indicated in the Unified Scaling Factor subfield.

The Idle Options field 208 may indicate the options associated with the BSS Idle capability of the BSS Max Idle Period element 200.

FIG. 2B depicts an Idle Options field format 208, in accordance with one or more example embodiments of the present disclosure. The Idle Options field 208 may include 8 bits. The Idle Options field 208 may include a Protected Keep-Alive Required subfield 210, B0. The Protected Keep-Alive Required subfield 210 may be set to 1 to indicate that only a protected frame indicates activity. The Protected Keep-Alive Required subfield 210 may be set to 0 to indicate that either an unprotected or a protected frame indicates activity.

The Idle Options field 208 may include a Validity Across Bands For A Multi-band Device subfield 212, B1. The Validity Across Bands For A Multi-band Device subfield 212 may be set to 1 to indicate that the frames to indicate activity can be sent to any AP that the multi-band device operates, and are valid to prevent disassociation on all the APs of the multi-band device. The Validity Across Bands For A Multi-band Device subfield 212 may be set to 0 if the AP is not part of a multi-band device, or if it is part of a multi-band device where the disassociation decision only accounts for frames transmitted to the AP and not to the other APs of the same multi-band device, if any.

The Idle Options field 208 may include Reserved bits 214, B2-B7.

A multi-band STA may receive a BSS Max Idle Period element 200 in association with FST protocol. The FST protocol may indicate that if dot11BssMaxIdlePeriod is a nonzero (e.g., if the BSS Max Idle period is a value other than zero), the STA shall include the BSS Max Idle Period element 202 in the Association Response frame or the Reassociation Response frame. Otherwise, the STA shall not include the BSS Max Idle Period element 202 in the Association Response frame or the Reassociation Response frame. A STA may send protected or unprotected keepalive frames, as indicated in the Idle Options field 208. The Max Idle Period field 206 of the BSS Max Idle Period element 200 may indicate the time period during which a STA can refrain from transmitting frames to its associated AP without being disassociated. A non-AP STA is considered inactive if the AP has not received a Data frame, PS-Poll frame, or Management frame (protected or unprotected) of a frame exchange sequence initiated by the STA for a time period greater than or equal to the time specified by the Max Idle Period field 206. If the Idle Options field 208 requires protected keepalive frames, then the AP may disassociate the STA if no protected frames are received from the STA for a period indicated by the Max Idle Period field 206 of the BSS Max Idle Period element 200. If the Idle Options field 208 allows unprotected or protected keepalive frames, then the AP may disassociate the STA if no protected or unprotected frames are received from the STA for a duration indicated by the Max Idle Period field 206 of the BSS Max Idle Period element 200. It should be noted that the AP can disassociate or deauthenticate the STA at any time for other reasons even if the STA satisfies the keep-alive frame transmission requirements.

A multi-band dual connectivity system that manages multi-band dual connectivity with a new bit in a BSS Max Idle Period element 200 may operate such that if a non-AP STA receives a BSS Max Idle Period element 200 in an association response (or a reassociation response) with the Validity Across Bands For A Multi-band Device subfield 212 in the Idle Options field 208 set to 1 from an AP that is part of a multi-band device, the STA may be considered inactive if none of the APs from the same multi-band device has received a Data frame, PS-Poll frame, or Management frame (protected or unprotected) of a frame exchange sequence initiated by the STA or a STA that is part of the same multi-band device as the STA for a time period greater than or equal to the time specified by the Max Idle Period field 206. The AP may disassociate the STA and any STA that is part of the same multi-band device as the STA if no valid frames are received by any of the APs from the same multi-band device from the STA or a STA that is part of the same multi-band device as the STA for a period indicated by the Max Idle Period field 206 of the BSS Max Idle Period element 200.

It is understood that the above descriptions are for purposes of illustration and are not meant to be limiting.

Figure 3:
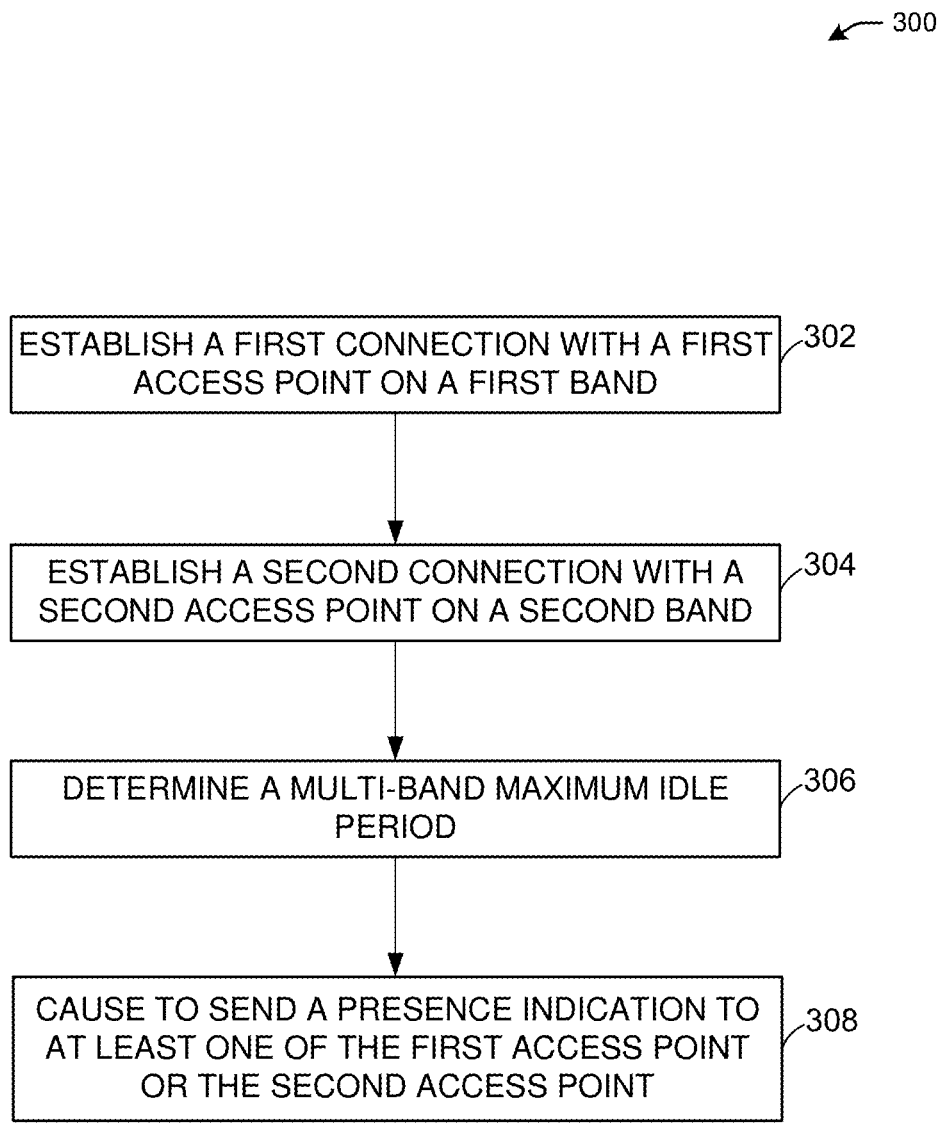
FIG. 3 illustrates a flow diagram of illustrative process for an illustrative multi-band dual connectivity system, in accordance with one or more example embodiments of the present disclosure.

FIG. 3 illustrates a flow diagram of illustrative process 300 for an illustrative enhanced PHY for 6 GHz disabled band system, in accordance with one or more example embodiments of the present disclosure.

At block 302, a device (e.g., the user device(s) 120 and/or the AP 102 of FIG. 1) may establish a first connection with a first access point on a first band. The device may comprise a transceiver configured to transmit and receive wireless signals. The device may comprise one or more antennas coupled to the transceiver.

At block 304, the device may establish a second connection with a second access point on a second band. The first connection and the second connection may be non-concurrent.

At block 306, the device may determine a multi-band maximum idle period. To determine the multi-band maximum idle period, the device may: identify a first maximum idle period received from the first access point; identify a second maximum idle period received from the second access point; and set the multi-band maximum idle period based on comparing the first maximum idle period to the second maximum idle period. The multi-band maximum idle period may be equal to the lower maximum idle period of the first maximum idle period and the second maximum idle period. To determine the multi-band maximum idle period, the device may: identify a Basic Service Set (BSS) Max Idle Period element received from one of the first access point or the second access point; and determine the multi-band maximum idle period based on the BSS Max Idle Period element. The device may determine whether the multi-band maximum idle period applies to the first access point, the second access point, or both the first access point and the second access point based on the BSS Max Idle Period element.

At block 308, the device may cause to send a presence indication to at least one of the first access point or the second access point within the multi-band maximum idle period.

It is understood that the above descriptions are for purposes of illustration and are not meant to be limiting.

Figure 4:
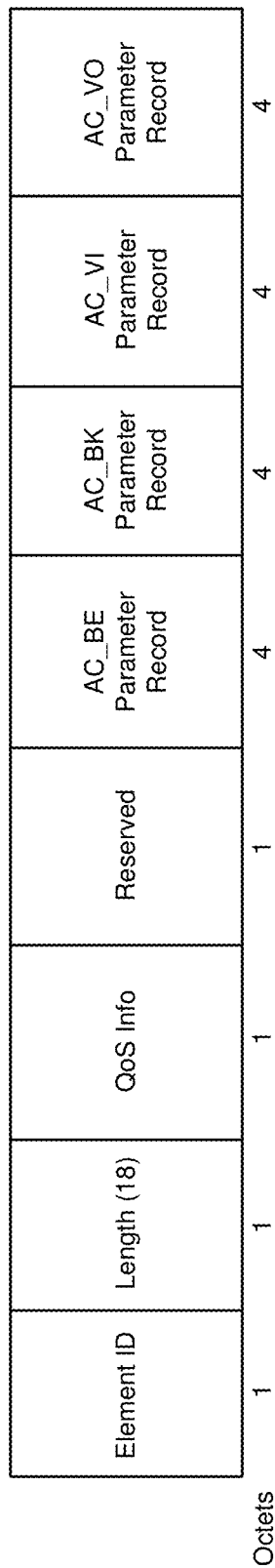
FIG. 4 depicts an illustrative schematic diagram for an enhanced distributed channel access (EDCA) parameter set element, in accordance with one or more example embodiments of the present disclosure.

FIG. 4 depicts an illustrative schematic diagram for an enhanced distributed channel access (EDCA) parameter set element, in accordance with one or more example embodiments of the present disclosure.

EDCA access may be parametrized by the AP using the EDCA Parameter Set Element that defines the CWmin, CWmax, AIFS, and TxOPlimit for all the access categories. This element may be transmitted in beacons and the parameters may apply to all STAs in the BSS. If the EDCA Parameter Set Element is not sent, default EDCA parameters may apply.

It is understood that the above descriptions are for purposes of illustration and are not meant to be limiting.

Figure 5:
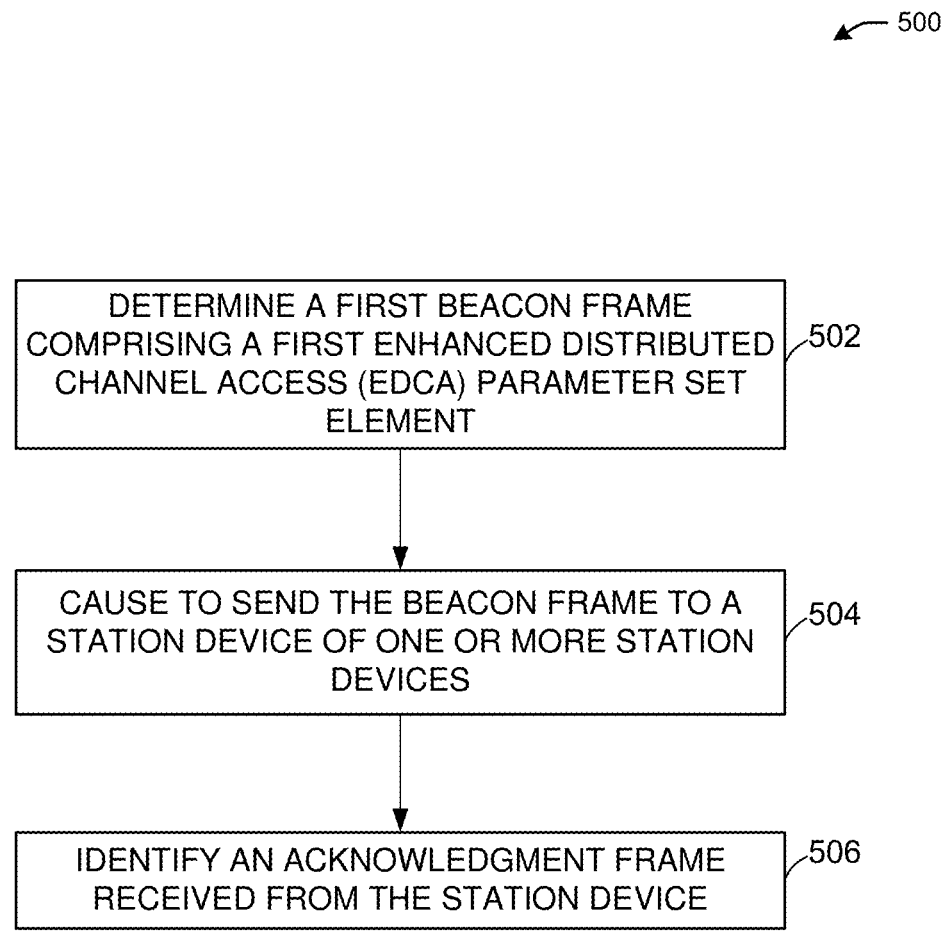
FIG. 5 illustrates a flow diagram of illustrative process for an illustrative per-user EDCA control system, in accordance with one or more example embodiments of the present disclosure.

FIG. 5 illustrates a flow diagram of illustrative process for an illustrative per-user EDCA control system, in accordance with one or more example embodiments of the present disclosure.

At block 502, a device (e.g., the user device(s) 120 and/or the AP 102 of FIG. 1) may determine a first beacon frame comprising a first Enhanced distributed channel access (EDCA) parameter set element.

At block 504, the device may cause to send the beacon frame to a station device of one or more station devices.

At block 506, the device may identify an acknowledgment frame received from the station device.

It is understood that the above descriptions are for purposes of illustration and are not meant to be limiting.

FIG. 6 shows a functional diagram of an exemplary communication station 600 in accordance with some embodiments. In one embodiment, FIG. 6 illustrates a functional block diagram of a communication station that may be suitable for use as an AP 102 (FIG. 1) or user device 120 (FIG. 1) in accordance with some embodiments. The communication station 600 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 600 may include communications circuitry 602 and a transceiver 610 for transmitting and receiving signals to and from other communication stations using one or more antennas 601. The transceiver 610 may be a device comprising both a transmitter and a receiver that are combined and share common circuitry (e.g., communication circuitry 602). The communication circuitry 602 may include amplifiers, filters, mixers, analog to digital and/or digital to analog converters. The transceiver 610 may transmit and receive analog or digital signals. The transceiver 610 may allow reception of signals during transmission periods. This mode is known as full-duplex, and may require the transmitter and receiver to operate on different frequencies to minimize interference between the transmitted signal and the received signal. The transceiver 610 may operate in a half-duplex mode, where the transceiver 610 may transmit or receive signals in one direction at a time.

The communications circuitry 602 may include circuitry that can operate the physical layer (PHY) communications and/or media access control (MAC) communications for controlling access to the wireless medium, and/or any other communications layers for transmitting and receiving signals. The communication station 600 may also include processing circuitry 606 and memory 608 arranged to perform the operations described herein. In some embodiments, the communications circuitry 602 and the processing circuitry 606 may be configured to perform operations detailed in FIGS. 1-5.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication station 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device, read-only memory (ROM), random-access memory (RAM), magnetic disk storage media, optical storage media, flash-memory devices and other storage devices and media.

In some embodiments, the communication station 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 600 may include one or more antennas 601. The antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some MIMO embodiments, the antennas may be effectively separated for spatial diversity and the different channel characteristics that may result between each of the antennas and the antennas of a transmitting station.

In some embodiments, the communication station 600 may include one or more of a keyboard, a display, a non-volatile memory port, multiple antennas, a graphics processor, an application processor, speakers, and other mobile device elements. The display may be an LCD screen including a touch screen.

Although the communication station 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 600 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 600 may include one or more processors and may be configured with instructions stored on a computer-readable storage device memory.

FIG. 7 illustrates a block diagram of an example of a machine 700 or system upon which any one or more of the techniques (e.g., methodologies) discussed herein may be performed. In other embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environments. The machine 700 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (i.e., drive unit) 716, a signal generation device 718 (e.g., a speaker), a multi-band dual connectivity device 719, a network interface device/transceiver 720 coupled to antenna(s) 730, and one or more sensors 728, such as a global positioning system (GPS) sensor, a compass, an accelerometer, or other sensor. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700.

In an example, one or any combination of the hardware processor 702, the main memory 704, the static memory 706, or the storage device 716 may constitute machine-readable media.

The multi-band dual connectivity device 719 may facilitate modifications to a BSS Max Idle period.

The multi-band dual connectivity device 719 may support a multi-band maximum idle period. If a multi-band STA is dual connected (e.g., associated) to two or more multi-band APs (e.g., to a first AP on a first band, such as a 2.4 GHz band, to a second AP on a second band, such as a 5 GHz band, and/or to a third AP on a third band, such as a 6 GHz band) that support a multi-band maximum idle period, one or more of the two or more multi-band APs may signal the multi-band maximum idle period to the multi-band STA. The two or more multi-band APs may be collocated or may be spatially separated. In other words, the present disclosure contemplates that the two or more multi-band APs may be housed within a single unit or may be associated with separate devices.

The multi-band dual connectivity device 719 may determine a multi-band maximum idle period based on an existing BSS Max Idle period. One multi-band AP or multiple multi-band APs may signal the multi-band maximum idle period to the multi-band STA.

The multi-band dual connectivity device 719 may determine that the multi-band maximum idle period may be an existing BSS Max Idle period. For example, if the BSS Max Idle period(s) advertised by the multiple APs in the different bands are different (e.g., a first BSS Max Idle period of a first AP that communicates with a STA on a first band has a first value, a second BSS Max Idle period of a second AP that communicates with the STA on a second band has a second value that is different from the first value, and/or a third BSS Max Idle period of a third AP that communicates with the STA on a third band has a third value that is different from the first value), the multi-band maximum idle period may be equal to the lowest BSS Max Idle period across the multiple APs (e.g., across the first AP, the second AP, and the third AP).

The multi-band dual connectivity device 719 may manage multi-band dual connectivity with fast session transfer (FST) protocol. The existing FST protocol may be modified such that if a first device that is multi-band capable is operating as a non-AP STA in each of the supported bands of a second multi-band device operating as an AP STA in each of the supported bands, and the first multi-band device has established an FST session on each of the supported bands with the second multi-band device so that the non-AP STAs from the first device are associated with the AP STAs from the second device on multiple bands, then the FST BSS Max Idle period may be the minimum between the BSS Max Idle period advertised by the AP STAs in different bands.

The multi-band dual connectivity device 719 may use a FST protocol that is further modified such that a non-AP STA of the first multi-band device that is included in the FST session is considered inactive if none of the APs from the second device that is included in the FST session has received a Data frame, PS-Poll frame, or Management frame (protected or unprotected) of a frame exchange sequence initiated by the STA for a time period greater than or equal to the time specified by the FST Max Idle Period field.

The multi-band dual connectivity device 719 may define a bit in a BSS Max Idle period element that indicates that the provided BSS Max Idle period is valid for all of the bands on which the AP operates (e.g., on one or more of a 2.4 GHz band, a 5 GHz band, and/or a 6 GHz band) or is valid for only the current band. If a provided BSS Max Idle period is indicated as being valid for all of the bands on which the AP operates, then a STA may indicate its presence on all of the bands (and avoid being disassociated from any of the bands) by sending a frame in any of the bands. If a provided BSS Max Idle period is indicated as being valid for only the current band, a STA may have to indicate is presence on each of the bands.

The multi-band dual connectivity device 719 may allow a STA to indicate its presence (and not be disassociated) by sending a frame at least once every multi-band maximum idle period in at least one of the bands to one of the APs. This presence indication in one of the bands by the STA may act as a presence indication transmitted in all the bands with all the APs that are part of the dual connectivity. As a consequence, a STA cannot be disassociated from a first AP in a first band if the STA sent a frame to the second AP in the second band if the STA is dual connected with the first AP and with the second AP.

The multi-band dual connectivity device 719 may determine a multi-band maximum idle period. The maximum idle period may be based on one or more of: information advertised by two or more APs during a FST session and/or on a BSS Max Idle period element identified from one or more APs. The STA may cause to send a frame to the one or more APs based at least in part on the multi-band maximum idle period. In some embodiments, the frame may be one or more of a Data frame, PS-Poll frame, or Management frame (protected or unprotected) of a frame exchange sequence initiated by the STA. The STA may be associated with at least two of a first AP on a first band (e.g., on a 2.4 GHz band), a second AP on a second band that is different from the first band (e.g., on a 5 GHz band), and a third AP on a third band that is different from the first band and from the second band (e.g., on a 6 GHz band). The STA may cause to send the frame to at one of the first AP on the first band, the second AP on the second band, and the third AP on the third band. Each of the APs may determine, based at least in part on the frame, not to disassociate the STA from that AP, regardless of the band on which the frame was sent.

The multi-band dual connectivity device 719 may allow a STA to stay dual connected and/or associated with multiple APs even if the STA stays in power save for a long period of time and only signals the STA's presence in one of the two or more bands. The use of a multi-band maximum idle period may save energy and overhead.

The multi-band dual connectivity device 719 may carry out or perform any of the operations and processes (e.g., process 500) described and shown above.

It is understood that the above are only a subset of what the multi-band dual connectivity device 719 may be configured to perform and that other functions included throughout this disclosure may also be performed by the multi-band dual connectivity device 719.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., IEEE 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), MIMO, or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a MIMO transceiver or device, a SIMO transceiver or device, a MISO transceiver or device, a single input single output (SISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device, the device comprising processing circuitry coupled to storage, the processing circuitry configured to: establish a first connection with a first access point on a first band; establish a second connection with a second access point on a second band; determine a multi-band maximum idle period; and cause to send a presence indication to at least one of the first access point or the second access point within the multi-band maximum idle period.

Example 2 may include the device of example 1 and/or some other example herein, wherein to determine the multi-band maximum idle period, the processing circuitry is further configured to: identify a first maximum idle period received from the first access point; identify a second maximum idle period received from the second access point; compare the first maximum idle period to the second maximum idle period; and set the multi-band maximum idle period based on the comparing the first maximum idle period to the second maximum idle period.

Example 3 may include the device of example 2 and/or some other example herein, wherein the multi-band maximum idle period is equal to the lower maximum idle period of the first maximum idle period and the second maximum idle period.

Example 4 may include the device of example 1 and/or some other example herein, wherein to determine the multi-band maximum idle period, the processing circuitry is further configured to: identify a Basic Service Set (BSS) Max Idle Period element received from one of the first access point or the second access point; and determine the multi-band maximum idle period based on the BSS Max Idle Period element.

Example 5 may include the device of example 4 and/or some other example herein, wherein the processing circuitry is further configured to determine the multi-band maximum idle period applies to the first access point, the second access point, or both the first access point and the second access point based on the BSS Max Idle Period element.

Example 6 may include the device of example 1 and/or some other example herein, wherein the first connection and the second connection are non-concurrent.

Example 7 may include the device of example 1 and/or some other example herein, further comprising a transceiver configured to transmit and receive wireless signals.

Example 8 may include the device of example 7 and/or some other example herein, further comprising an antenna coupled to the transceiver.

Example 9 may include a non-transitory computer-readable medium storing computer-executable instructions which when executed by one or more processors result in performing operations comprising: establishing a first connection with a first access point on a first band; establishing a second connection with a second access point on a second band; determining a multi-band maximum idle period; and causing to send a presence indication to at least one of the first access point or the second access point within the multi-band maximum idle period.

Example 10 may include the non-transitory computer-readable medium of example 9 and/or some other example herein, wherein determining a multi-band maximum idle period comprises: identifying a first maximum idle period received from the first access point; identifying a second maximum idle period received from the second access point; comparing the first maximum idle period to the second maximum idle period; and setting the multi-band maximum idle period based on the comparing the first maximum idle period to the second maximum idle period.

Example 11 may include the non-transitory computer-readable medium of example 10 and/or some other example herein, wherein the multi-band maximum idle period is equal to the lower maximum idle period of the first maximum idle period and the second maximum idle period.

Example 12 may include the non-transitory computer-readable medium of example 9 and/or some other example herein, wherein determining a multi-band maximum idle period comprises: identifying a Basic Service Set (BSS) Max Idle Period element received from one of the first access point or the second access point; and determining the multi-band maximum idle period based on the BSS Max Idle Period element.

Example 13 may include the non-transitory computer-readable medium of example 12 and/or some other example herein, wherein the operations further comprise determining the multi-band maximum idle period applies to the first access point, the second access point, or both the first access point and the second access point based on the BSS Max Idle Period element.

Example 14 may include the non-transitory computer-readable medium of example 9 and/or some other example herein, wherein the first connection and the second connection are non-concurrent.

Example 15 may include a method comprising: establishing, by one or more processors, a first connection with a device on a first band; establishing, by the one or more processors, a second connection with the device on a second band, wherein the first connection and the second connection are non-concurrent; determining, by the one or more processors, a multi-band maximum idle period; and causing to send, by the one or more processors, an indication of the multi-band maximum idle period to the device.

Example 16 may include the method of example 15 and/or some other example herein, further comprising: identifying on the first band, by the one or more processors, a presence indication from the device; determining, by the one or more processors, that the presence indication was received within the multi-band maximum idle period; and determining, by the one or more processors, to maintain association with the device on the first band and on the second band.

Example 17 may include the method of example 15 and/or some other example herein, wherein the indication of the multi-band idle period includes an indication that the multi-band idle period applies to the first band and to the second band.

Example 18 may include the method of example 15 and/or some other example herein, wherein the first connection and the second connection are fast session transfer (FST) sessions.

Example 19 may include the method of example 15 and/or some other example herein, wherein the indication of the multi-band idle period is included in a basic service set (BSS) Max Idle Period element.

Example 20 may include the method of example 15 and/or some other example herein, wherein the BSS Max Idle Period element includes an indication that the multi-band idle period applies to one of the first connection, the second connection, or both the first connection and the second connection.

Example 21 may include an apparatus comprising means for: establishing a first connection with a first access point on a first band; establishing a second connection with a second access point on a second band; determining a multi-band maximum idle period; and causing to send a presence indication to at least one of the first access point or the second access point.

Example 22 may include the apparatus of example 21 and/or some other example herein, wherein the means for determining a multi-band maximum idle period comprises means for: identifying a first maximum idle period received from the first access point; identifying a second maximum idle period received from the second access point; and setting the multi-band maximum idle period based on comparing the first maximum idle period to the second maximum idle period.

Example 23 may include the apparatus of example 22 and/or some other example herein, wherein the multi-band maximum idle period is equal to the lower maximum idle period of the first maximum idle period and the second maximum idle period.

Example 24 may include the apparatus of example 21 and/or some other example herein, wherein the means for determining a multi-band maximum idle period comprises means for: identifying a Basic Service Set (BSS) Max Idle Period element received from one of the first access point or the second access point; and determining the multi-band maximum idle period based on the BSS Max Idle Period element.

Example 25 may include the apparatus of example 24 and/or some other example herein, wherein the apparatus further comprises means for determining whether the multi-band maximum idle period applies to the first access point, the second access point, or both the first access point and the second access point based on the BSS Max Idle Period element.

Example 26 may include the apparatus of example 21 and/or some other example herein, wherein the first connection and the second connection are non-concurrent.

Example 27 may include one or more non-transitory computer-readable media comprising instructions to cause an electronic device, upon execution of the instructions by one or more processors of the electronic device, to perform one or more elements of a method described in or related to any of examples 1-26, or any other method or process described herein.

Example 28 may include an apparatus comprising logic, modules, and/or circuitry to perform one or more elements of a method described in or related to any of examples 1-26, or any other method or process described herein.

Example 29 may include a method, technique, or process as described in or related to any of examples 1-26, or portions or parts thereof.

Example 30 may include an apparatus comprising: one or more processors and one or more computer readable media comprising instructions that, when executed by the one or more processors, cause the one or more processors to perform the method, techniques, or process as described in or related to any of examples 1-26, or portions thereof.

Example 31 may include a method of communicating in a wireless network as shown and described herein.

Example 32 may include a system for providing wireless communication as shown and described herein.

Example 33 may include a device for providing wireless communication as shown and described herein.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
    establish a first connection with a first access point on a first band;
    establish a second connection with a second access point on a second band;
    determine a multi-band maximum idle period;
    identify a first maximum idle period received from the first access point;
    identify a second maximum idle period received from the second access point;
    compare the first maximum idle period to the second maximum idle period;
    set the multi-band maximum idle period based on the comparing the first maximum idle period to the second maximum idle period; and
    cause to send a presence indication to at least one of the first access point or the second access point within the multi-band maximum idle period.

2. The device of claim 1, wherein the multi-band maximum idle period is equal to a lower maximum idle period of the first maximum idle period and the second maximum idle period.

3. The device of claim 1, wherein to determine the multi-band maximum idle period, the processing circuitry is further configured to:
    identify a Basic Service Set (BSS) Max Idle Period element received from one of the first access point or the second access point; and
    determine the multi-band maximum idle period based on the BSS Max Idle Period element.

4. The device of claim 3, wherein the processing circuitry is further configured to determine the multi-band maximum idle period applies to the first access point, the second access point, or both the first access point and the second access point based on the BSS Max Idle Period element.

5. The device of claim 1, wherein the first connection and the second connection are non-concurrent.

6. The device of claim 1, further comprising a transceiver configured to transmit and receive wireless signals.

7. The device of claim 6, further comprising one or more antennas coupled to the transceiver.

8. A non-transitory computer-readable medium storing computer-executable instructions which when executed by one or more processors result in performing operations comprising:
    establishing a first connection with a first access point on a first band;
    establishing a second connection with a second access point on a second band;
    determining a multi-band maximum idle period;
    identifying a first maximum idle period received from the first access point;
    identifying a second maximum idle period received from the second access point;
    comparing the first maximum idle period to the second maximum idle period;
    setting the multi-band maximum idle period based on the comparing the first maximum idle period to the second maximum idle period; and
    causing to send a presence indication to at least one of the first access point or the second access point within the multi-band maximum idle period.

9. The non-transitory computer-readable medium of claim 8, wherein the multi-band maximum idle period is equal to a lower maximum idle period of the first maximum idle period and the second maximum idle period.

10. The non-transitory computer-readable medium of claim 8, wherein determining the multi-band maximum idle period comprises:
    identifying a Basic Service Set (BSS) Max Idle Period element received from one of the first access point or the second access point; and
    determining the multi-band maximum idle period based on the BSS Max Idle Period element.

11. The non-transitory computer-readable medium of claim 10, wherein the operations further comprise determining the multi-band maximum idle period applies to the first access point, the second access point, or both the first access point and the second access point based on the BSS Max Idle Period element.

12. The non-transitory computer-readable medium of claim 8, wherein the first connection and the second connection are non-concurrent.

13. A method comprising:
    establishing, by one or more processors, a first connection with a device on a first band;
    establishing, by the one or more processors, a second connection with the device on a second band, wherein the first connection and the second connection are non-concurrent;
    determining, by the one or more processors, a multi-band maximum idle period;
    identifying a first maximum idle period received on the first connection;
    identifying a second maximum idle period received on the second connection;

comparing the first maximum idle period to the second maximum idle period;

setting the multi-band maximum idle period based on the comparing the first maximum idle period to the second maximum idle period; and causing to send, by the one or more processors, an indication of the multi-band maximum idle period to the device.

14. The method of claim 13, further comprising:

identifying on the first band, by the one or more processors, a presence indication from the device;

determining, by the one or more processors, that the presence indication was received within the multi-band maximum idle period; and determining, by the one or more processors, to maintain association with the device on the first band and on the second band.

15. The method of claim 13, wherein the indication of the multi-band idle period indicates that the multi-band idle period applies to the first band and to the second band.

16. The method of claim 13, wherein the first connection and the second connection are fast session transfer (FST) sessions.

17. The method of claim 13, wherein the indication of the multi-band idle period is included in a basic service set (BSS) Max Idle Period element.

18. The method of claim 13, wherein the BSS Max Idle Period element indicates that the multi-band idle period applies to one of the first connection, the second connection, or both the first connection and the second connection.

* * * * *